United States Patent
Jensen et al.

[19]

[11] Patent Number: 6,101,260
[45] Date of Patent: *Aug. 8, 2000

[54] COMMUNICATION HEADSET

[75] Inventors: Wolfgang Jensen; James Robertson, both of Aptos, Calif.

[73] Assignee: GN Netcom, Inc., Scotts Valley, Calif.

[*] Notice: This patent is subject to a terminal disclaimer.

[21] Appl. No.: 09/246,405

[22] Filed: Feb. 8, 1999

Related U.S. Application Data

[63] Continuation of application No. 08/590,744, Jan. 24, 1996.

[51] Int. Cl.⁷ ................................................ H04R 25/00
[52] U.S. Cl. ..................... 381/381; 381/374; 381/370; 379/430
[58] Field of Search ..................... 381/370, 371, 381/374, 375, 376, 380, 381, 383, 330, 71.6, 379, FOR 149, FOR 150; 379/430; 455/90; 181/128, 129

[56] References Cited

U.S. PATENT DOCUMENTS

| | | | |
|---|---|---|---|
| 817,457 | 4/1906 | Turner | 179/156 |
| 1,587,643 | 6/1926 | Harman . | |
| 2,474,135 | 6/1949 | White | 179/182 |
| 2,882,348 | 4/1959 | Erickson | 179/107 |
| 2,938,083 | 5/1960 | Herrmann | 179/107 |
| 3,440,365 | 4/1969 | Bryant et al. | 179/156 |
| 3,527,901 | 9/1970 | Geib | 179/107 |
| 3,548,118 | 12/1970 | Hutchings | 179/156 |
| 3,665,122 | 5/1972 | Weiss | 179/107 |
| 3,692,958 | 9/1972 | Dymoke | 179/156 |
| 3,862,378 | 1/1975 | Norris | 179/156 |
| 4,020,297 | 4/1977 | Brodie | 179/156 |
| 4,273,969 | 6/1981 | Foley et al. | 179/156 |
| 4,420,657 | 12/1983 | Larkin | 179/156 |
| 4,893,344 | 1/1990 | Trägardh et al. | 381/187 |
| 4,917,504 | 4/1990 | Scott et al. | 381/187 |
| 5,035,005 | 7/1991 | Hung | 2/209 |
| 5,117,464 | 5/1992 | Jones et al. | 381/183 |
| 5,210,792 | 5/1993 | Kajihara | 379/430 |
| 5,260,997 | 11/1993 | Gattey et al. | 379/430 |
| 5,298,692 | 3/1994 | Ikeda et al. | 181/135 |
| 5,410,608 | 4/1995 | Lucey et al. | 381/169 |
| 5,414,769 | 5/1995 | Gattey et al. | 179/430 |
| 5,450,496 | 9/1995 | Burris et al. | 381/183 |
| 5,655,026 | 8/1997 | Peters et al. | 381/370 |

FOREIGN PATENT DOCUMENTS

| | | | |
|---|---|---|---|
| 5 637 759 A1 | 4/1990 | France | H04R 1/10 |
| 3332 496 A1 | 3/1985 | Germany | H04R 1/10 |
| 3723 809 A1 | 1/1989 | Germany | H04R 25/00 |
| 0399145 | 10/1942 | Italy . | |
| 286185 | 3/1928 | United Kingdom . | |
| WO 95/15044 | 1/1995 | WIPO | H04M 1/05 |

OTHER PUBLICATIONS

*PCT Notification of Transmittal of the International Search Report or the Declaration.

*Primary Examiner*—Huyen Le
*Attorney, Agent, or Firm*—Limbach & Limbach L.L.P.

[57] ABSTRACT

A communications headset has an earpiece housing that rests on top of the ear and which also has a receiver assembly coupled to the earpiece housing. The receiver assembly is rotatable between a position at which the receiver assembly is against the ear and a position at which the receiver assembly is rotated away from the ear, thereby allowing a user of the headset to wear the headset comfortably even at times when the headset is not in use for communication. The receiver assembly is biased toward the ear, thereby acoustically coupling the receiver assembly reliably and snugly to the ear when the receiver assembly is at the position against the ear. When the receiver assembly is at the position rotated away from the ear, the receiver assembly is held securely in that position.

8 Claims, 7 Drawing Sheets

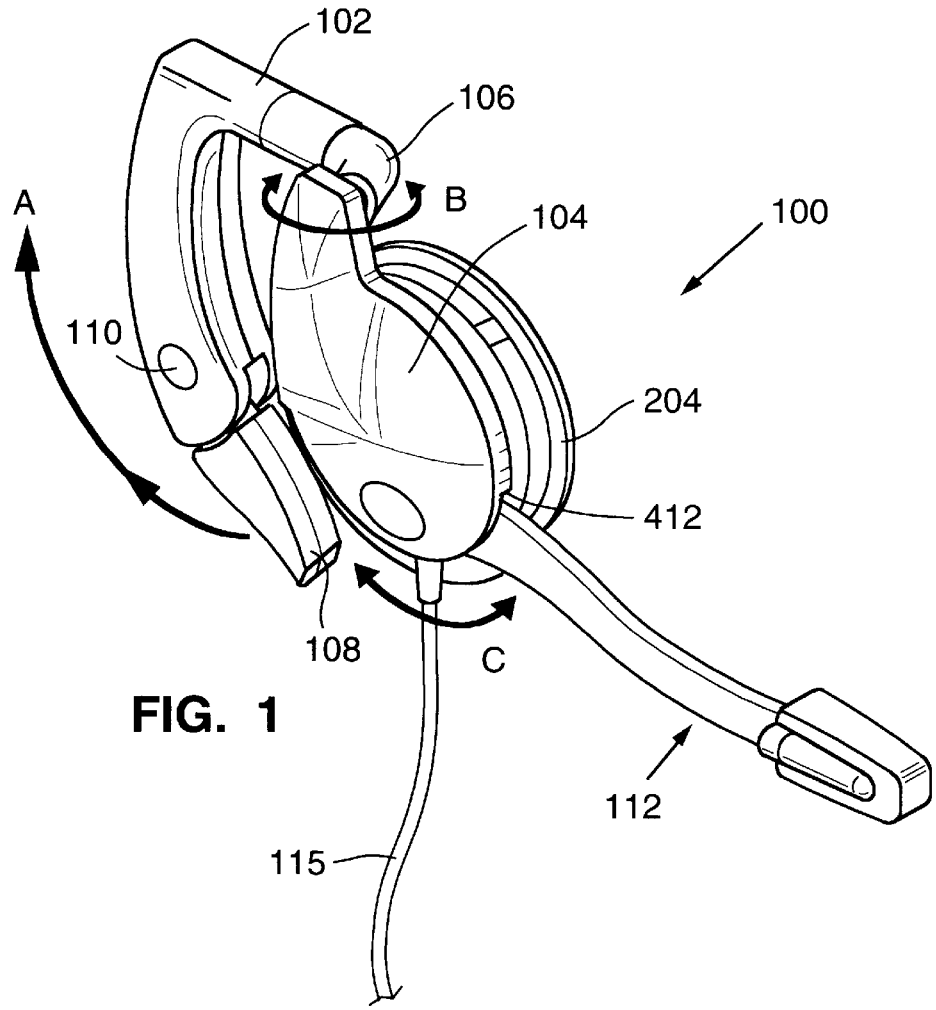
FIG. 1
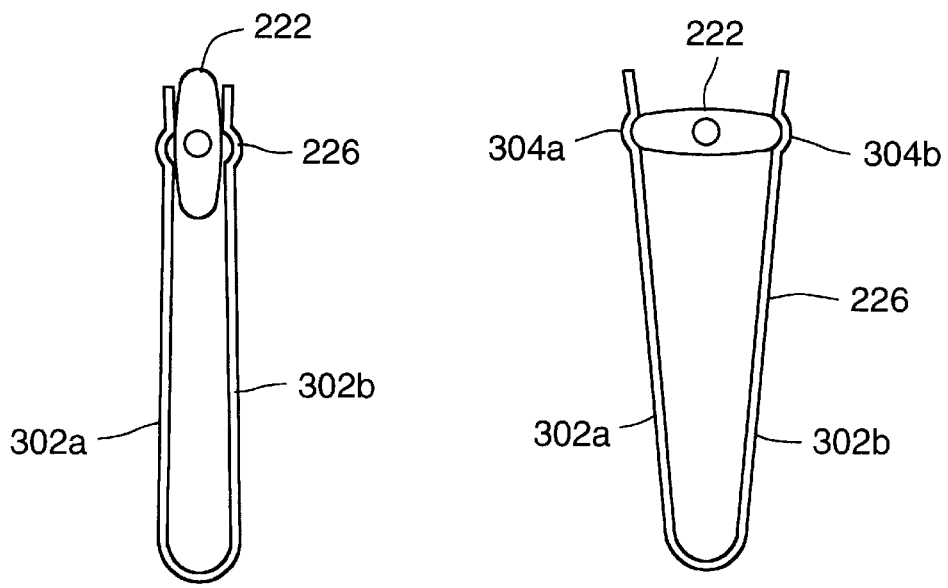
FIG. 3A  FIG. 3B

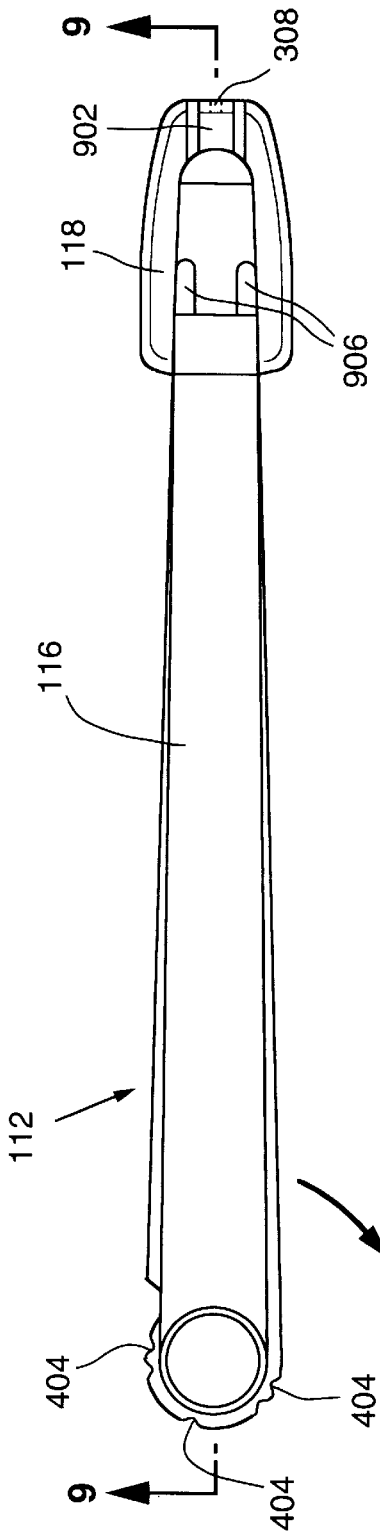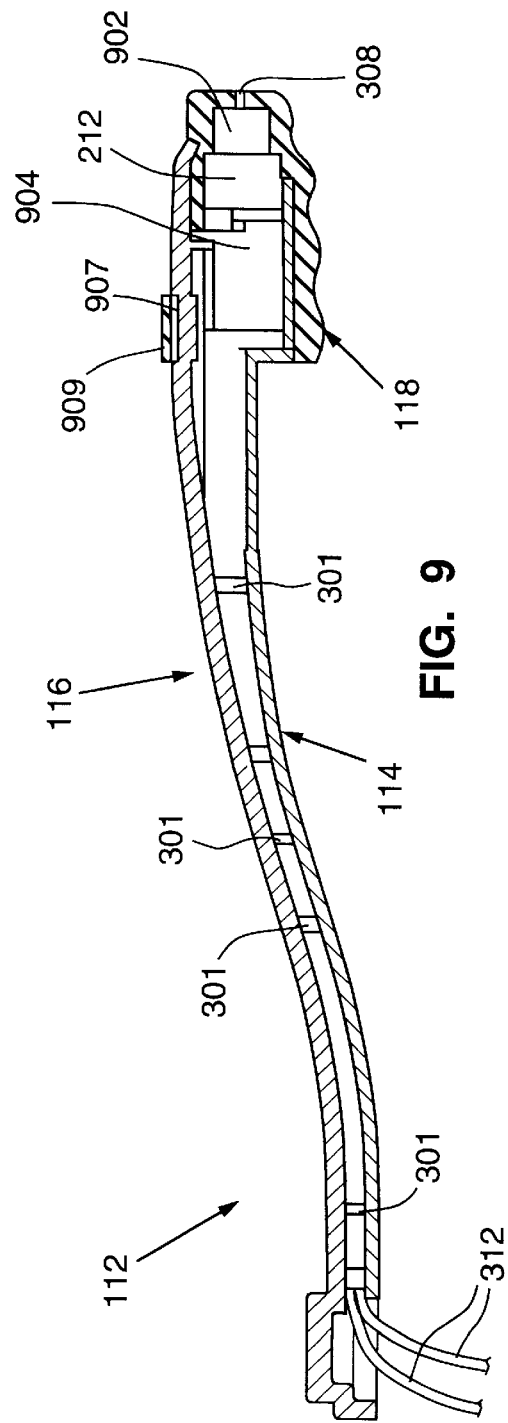

COMMUNICATION HEADSET

This is a continuation of application Ser. No. 08/590,744, filed Jan. 24, 1996.

TECHNICAL FIELD

The present invention relates to communication headsets and, in particular, to a communication headset which rests stably on one ear of a user and is configured such that a receiver assembly of the headset may be coupled snugly to the ear or, alternately, the receiver assembly may be securely held in a position rotated away from the ear.

BACKGROUND

As communication headsets have evolved, the trend is for manufacturers to make the headsets smaller while attempting to increase performance, comfort, and ease of use.

There are many small, high-performance headsets available to today's consumer, but many of these small headsets do not rest both stably and comfortably on the user's head, with the receiver of the headset reliably acoustically coupled to the user's ear. In addition, many headsets are not comfortable enough for the user to wear when the headset is temporarily not in use (e.g., between incoming telephone calls when the user is a switchboard operator). In particular, to better hear, between calls, what is happening in the room or to converse with another person, it is not unusual for a user to remove the receiver from his or her ear. Conventionally, this requires the user to completely remove the headset from his or her head. Then, when the headset is again required (e.g., to answer a new incoming telephone call), the user must once again don the headset.

SUMMARY

Broadly stated, the present invention, to be described in greater detail below, is directed to a communications headset which has an earpiece housing that rests on top of the ear and which also has a receiver assembly coupled to the earpiece housing.

In accordance with one aspect of the invention, the receiver assembly is rotatable between a stable position at which the receiver assembly rests against the ear and a stable position at which the receiver assembly is rotated away from the ear, thereby allowing a user of the headset to wear the headset comfortably even at times when the headset is not in use for communication.

In accordance with another aspect of the invention, the receiver assembly is biased toward the ear, thereby acoustically coupling the receiver assembly reliably and snugly to the ear when the receiver assembly is at the position against the ear. When the receiver assembly is at the position rotated away from the ear, the receiver assembly is held securely in that position as well.

BRIEF DESCRIPTION OF THE DRAWINGS

FIG. 1 is an assembled side elevational view of a communications headset in accordance with an embodiment of the present invention.

FIGS. 3a and 3b illustrate in detail the relationship of the paddle-shaped end of the shaft to the spring housed within the earpiece housing.

FIG. 8 is a bottom view of the microphone boom assembly of the communications headset of FIG. 1.

FIG. 9 is a cross-sectional view, across the line 9—9 in FIG. 8, of the microphone boom assembly of the communications headset of FIG. 1.

DETAILED DESCRIPTION

The limitations of the detailed embodiments below are provided for example only, with the scope of the invention set forth by the appended claims. In the preferred and alternate embodiments which follow, and in the accompanying drawings, like reference numbers refer to similar structures.

Figure 2:
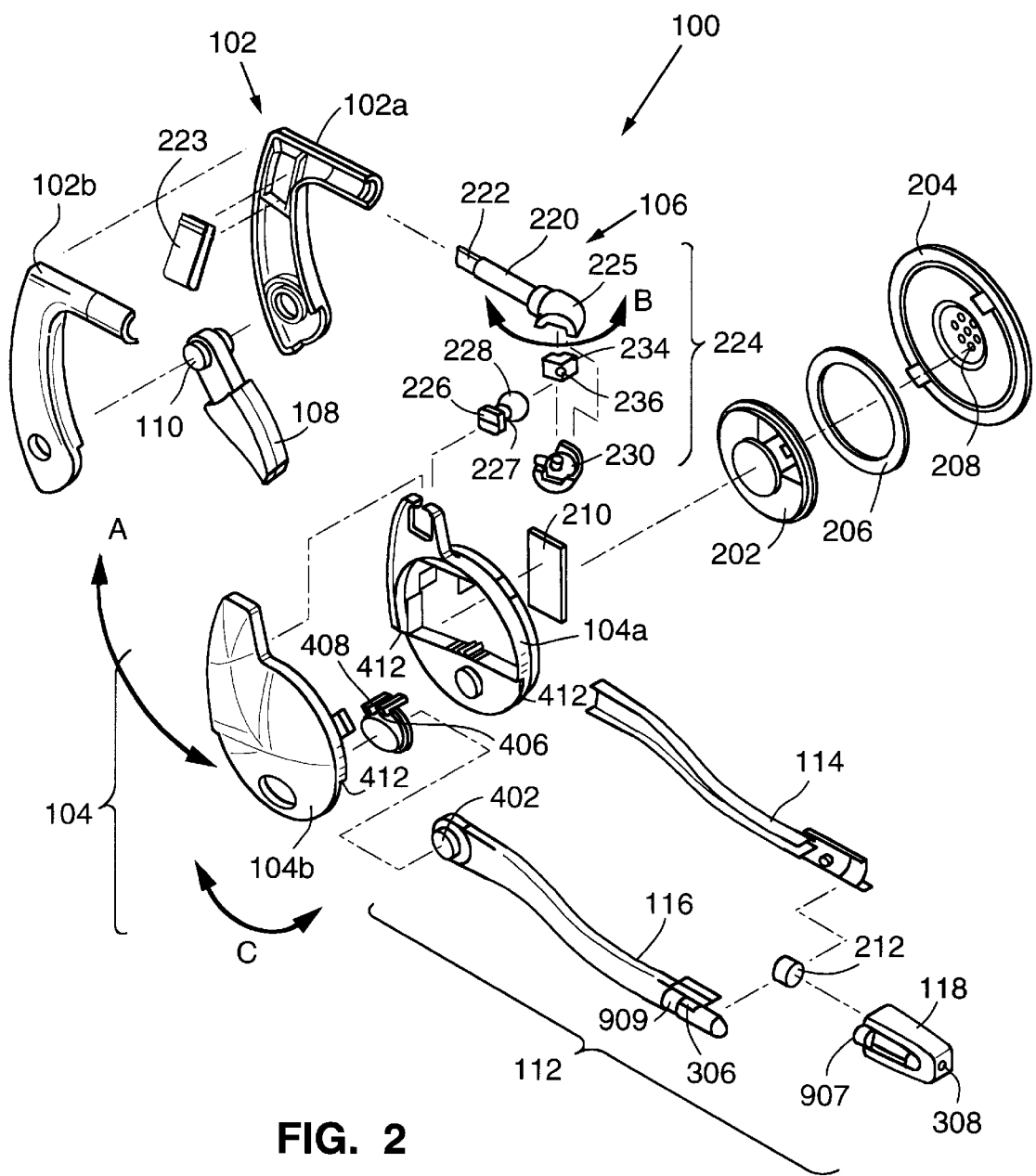
FIG. 2 is an exploded side elevational view of the headset of FIG. 1.

FIG. 1 (assembled side elevational view) and FIG. 2 (exploded side elevational view) show a preferred embodiment of a communications headset 100 in accordance with the present invention. An earpiece housing 102 is designed to rest on top of a user's ear. A retainer 108, attached to the earpiece housing 102 by a retainer pivot 110, may be rotated up against the bottom of the ear to stabilize the headset 100 on the user's head. Such a retainer is disclosed in U.S. Pat. No. 5,414,769 to Gattey et al. and assigned evenly herewith.

A receiver assembly 104, located over the user's ear, is coupled to the earpiece housing 102 by a coupling assembly 106. The receiver assembly 104 houses a receiver element 202 between a receiver assembly first half 104a and a receiver assembly second half 104b. The receiver element 202 produces sound to be directed into the user's ear. The receiver element 202 is snap-fitted into place in the receiver assembly 104 by a receiver cover 204. A gasket 206 is provided between the receiver cover 204 and the receiver assembly first half 104a to acoustically seal the receiver assembly 104, thus ensuring that most of the sound produced by the receiver element 102 is directed to the user's ear via the acoustic port holes 208 formed in the receiver cover 204. A printed circuit board 210 is provided within the receiver assembly for providing electronic control functions of the communications headset 100.

Figure 5:
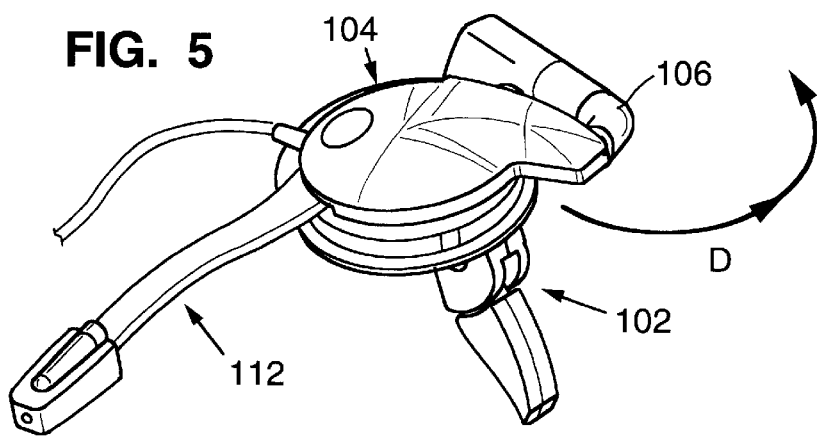
FIG. 5 is a side elevational view of the communications headset of FIG. 1 with the earpiece assembly rotated away from the ear.

The coupling assembly 106 is configured such that the receiver assembly 104 is rotatable, with respect to the earpiece housing 102, in the direction shown by arrow A. Specifically, the receiver assembly 104 is rotatable from the position shown in FIG. 1, at which the receiver assembly is against the ear, to a position at which the receiver assembly 104 is rotated away from the ear (e.g., at least 90 degrees away from the ear as shown in FIG. 5). As can be seen with reference to FIG. 2, the coupling assembly 106 includes a shaft 220 which is formed in a paddle shape at one end 222. The paddle-shaped end 222 of the shaft 220 is coupled to a spring 223 provided within the earpiece housing 102.

A swivel assembly 224 is formed at the other end of the shaft 220, and the receiver assembly 104 is attached to the coupling assembly 106 by the swivel assembly 224. The details of the swivel assembly 224 will be discussed later in this disclosure with particular reference to FIG. 4. However, it is sufficient for now to note that swivel assembly 224 attaches the receiver assembly 104 to the coupling assembly 106 in a manner such that the receiver assembly 104 cannot rotate, with respect to the swivel assembly 224, in the direction shown by the arrow A.

Referring now to FIGS. 3a and 3b, the spring 223 and the paddle-shaped end 222 of the shaft 220 are shown in cross-section. The spring 223 includes opposing sidewalls 302a and 302b. Referring first to FIG. 3a, when the receiver assembly 104 is in the position against the ear (FIG. 1), the paddle-shaped end 222 of the shaft 220 conforms to the sidewalls 302a and 302b of the spring 223. Significantly, the spring force stored in the sidewalls 302a and 302b of the spring 223 acts on the paddle-shaped end 222 of the shaft 220 to bias the receiver assembly 104 into position against the ear. This ensures that the receiver assembly 104 is coupled snugly and reliably against the ear.

Referring now to FIG. 3b, when the receiver assembly 104 is in the position rotated away from the ear (FIG. 5), the paddle-shaped end 222 of the shaft 220 rests in detents 304a and 304b, formed in sidewalls 302a and 302b, respectively. In this position, the spring force stored in the sidewalls 302a and 302b of the spring 223 causes the detents 304a and 304b formed in sidewalls 302a and 302b to push against the paddle-shaped end 222 of the shaft 220, thus holding the receiver assembly 104 securely at the position rotated away from the ear.

Referring again to FIGS. 1 and 2 the swivel assembly 224 is now discussed. The swivel assembly 224 is configured to allow for limited movement of the receiver assembly 104 in the directions shown by bidirectional arrow B, thus allowing the user to adjust the angle of the receiver assembly 104 to match the angle of the user's ear. Specifically, the two halves 104a and 104b of receiver assembly 104 are snap-fitted around a swivel post 226, and the swivel post 226 is attached to a swivel ball 228 by a swivel shaft 227. The swivel ball 228 is captured between a swivel housing 225 and a swivel cover 230. The "elbow" shape of the coupling assembly 106 serves to offset the receiver assembly 104 from the earpiece housing 106, thus providing greater freedom of angular adjustment.

Figure 4:
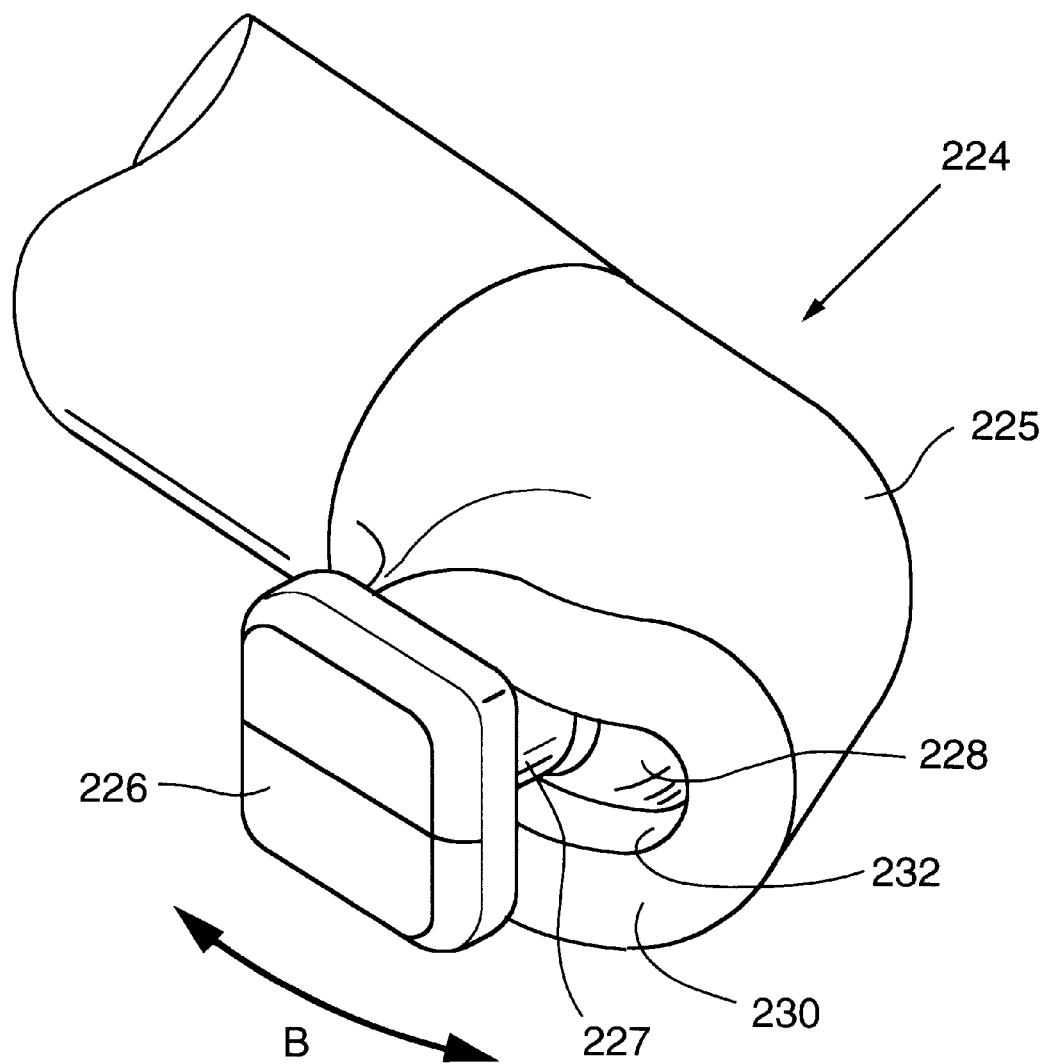
FIG. 4 illustrates in detail the coupling assembly and, for clarity of illustration, without the receiver assembly.

FIG. 4 shows the swivel assembly 224 in greater detail and in its assembled form. For clarity of illustration, the swivel assembly 224 is shown in FIG. 4 without the receiver assembly 104 fitted to the swivel post 226. As shown in FIG. 4, the swivel shaft 227 is configured for movement within an oblong aperture 232 formed between the swivel housing 225 and the swivel cover 230. Since the oblong aperture 232 has "minor" sides (i.e., shorter sides) whose length is only slightly larger than the diameter of the swivel shaft 227, the movement of the swivel shaft 227 is constrained to be only in the directions shown by the arrow B. In addition, when the swivel shaft 227 abuts either minor side of the oblong aperture 232, movement of the swivel shaft 227 in the directions shown by bidirectional arrow B is stopped.

Referring again to FIG. 2, a friction element 234, configured with convex spherical friction bumps 236, is captured between the swivel housing 225 and the swivel cover 230 along with the swivel ball 228. Frictional contact of the spherical friction bumps 236 to the swivel ball 228 provides some resistance of movement of the swivel shaft 227 along the oblong aperture 232 to hold the swivel shaft 227 in place once the angle of the receiver assembly 104 along bidirectional arrow B has been adjusted by the user.

Referring still to FIG. 2, a microphone boom assembly 112 is rotatably mounted, at its proximal end, to the receiver assembly 104 for rotation in a plane parallel to the side of the user's head when the receiver assembly 104 is against the ear (i.e., in the directions shown by bidirectional arrow C in FIGS. 1 and 2). The microphone boom assembly 112 includes a microphone boom housing 114 and a microphone boom cover 116. A microphone boom tip 118 is located at a distal end of the microphone boom assembly 112. The details of the microphone boom assembly 112 are shown in FIGS. 8 and 9.

The microphone boom housing 114, microphone boom cover 116 and microphone boom tip 118 are configured to house a microphone 212 which is positioned near the user's mouth to pick up his or her voice. Internal wiring (e.g., wires 312 in FIG. 9) connects the microphone 212 and receiver element 202 to a cable 115. Other wires (not shown) connect the receiver element 202 to the cable 115. The cable 115 in turn connects the headset 100 to external communications equipment (not shown).

The microphone boom cover 116 is snap-fitted to the microphone boom cover 116, capturing the microphone 212. In particular, a deformable strap 907 (which is also shown in FIG. 2) is snapped-fitted into a recess portion 909 of the microphone boom cover. Pins 301, formed in either or both of the microphone boom housing 114 or the microphone boom cover 116, aid in the correct alignment of the microphone boom cover 116 with respect to the microphone boom housing 114 when the microphone boom assembly 112 is assembled. The microphone boom tip 118, formed from rubber, is easily slid and snapped onto the thus-assembled microphone boom housing 114 and microphone boom cover 116.

The microphone boom tip 118 forms a front acoustic chamber 902. A rear acoustic chamber 904 is also partially formed from the distal ends of the microphone boom housing 114 and the microphone boom cover 116. Vent slots 906 are provided in the microphone boom cover 116 for venting the rear acoustic chamber 304. In addition to forming the front acoustic chamber 904, the microphone boom tip 114 provides an acoustic seal around the microphone 212 to acoustically separate the front acoustic chamber 902 from the rear acoustic chamber 904.

A sound port 308 formed in the rubber microphone boom tip 118 provides an acoustical interface to the front acoustic chamber 302. The sound port 308, which faces forward (rather than towards the user's mouth) when the communication headset 100 is worn by a user, receives acoustic signals from the wearer's mouth. The microphone 212 generates electrical signals which correspond to the received acoustical signals. The rear acoustic chamber 304 and the vent slots 306 provide a noise-cancellation effect, acoustically cancelling environmental noise from the electrical signals generated by the microphone.

Figure 10:
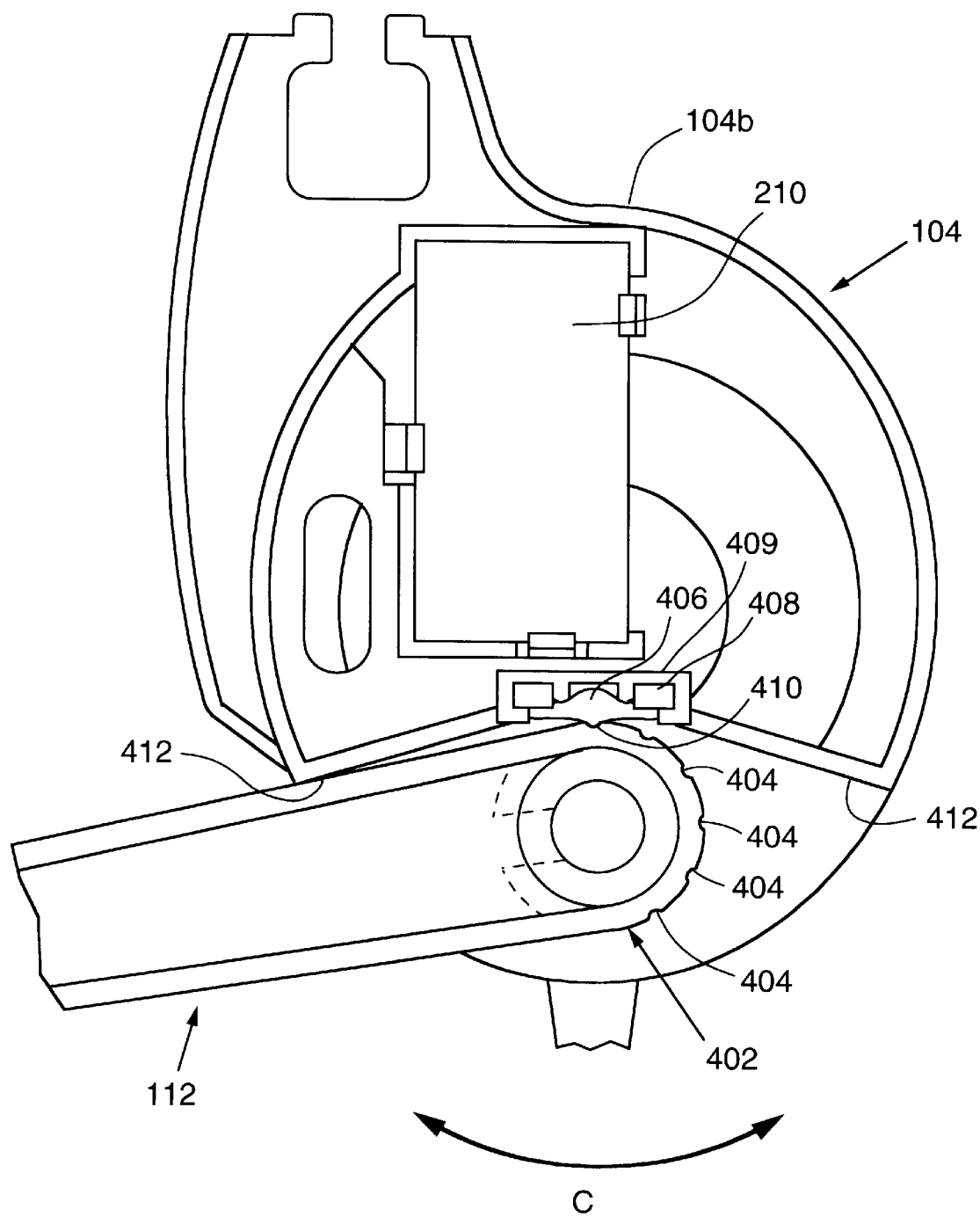
FIG. 10 is a cross-sectional detailed view of the microphone boom assembly of the communications headset of FIG. 1 at its interface to the receiver assembly.
Figure 11:
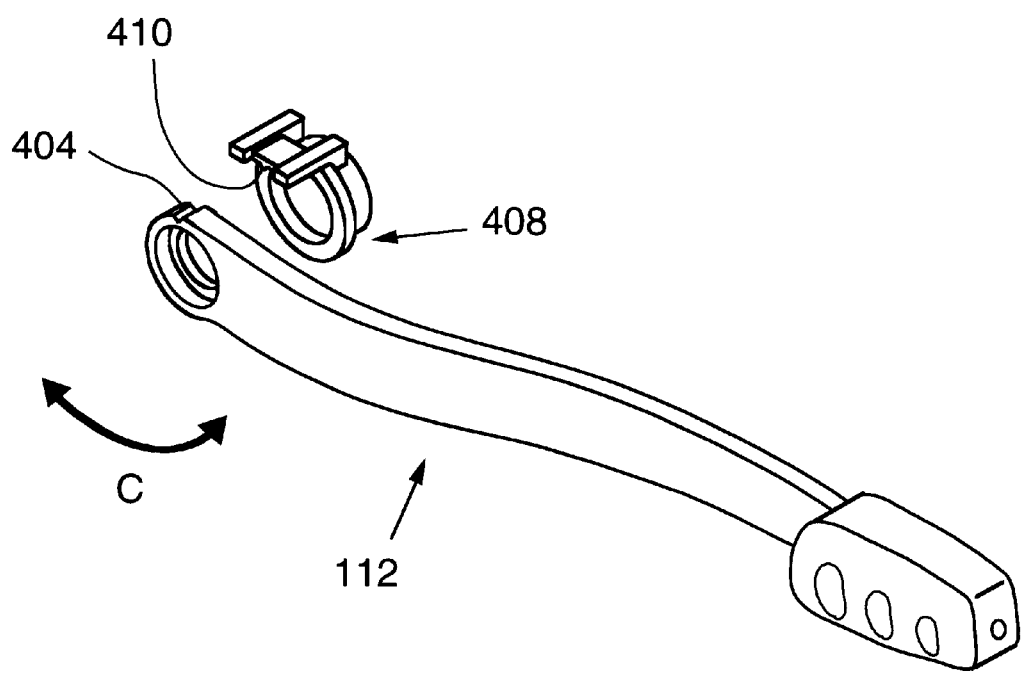
FIG. 11 is a perspective view of the microphone boom assembly.

As discussed above, microphone boom assembly 112 is rotatably mounted at its proximal end to the receiver assembly 104 for rotation in a plane parallel to the side of the user's head when the receiver assembly 104 is against the ear. The details of this mounting are now discussed with reference to FIGS. 10 and 11, but they can also be seen in the exploded view of FIG. 2. FIG. 10 shows the receiver assembly 104 and microphone boom assembly 112 in cross-section. A pivot post 402, formed at the proximal end of the microphone boom assembly 112, is captured between the receiver assembly first half 104a and the receiver assembly second half 104b by a pivot plug 408. This can also be seen in FIG. 11, which is a perspective view. Referring again to FIG. 10, the pivot plug 408 is captured in a housing 409 which is formed as part of the receiver assembly first half 104a and the receiver assembly second half 104b. For clarity of illustration, the housing 409 is not shown in FIG. 11.

The proximal end of the microphone boom assembly 112 is rounded, and the outer circumference of the proximal end is formed with a series of spaced-apart detents 404. The pivot plug 408 includes a projecting deformable rubber portion 406 on which a bump 410 is formed. As the microphone boom assembly 112 is rotated by the user in the directions shown by arrow C (which corresponds to the arrow C in FIGS. 1 and 2), the bump 410 causes the rubber portion 406 to deform. The spring energy stored within the rubber portion 406 provides a frictional contact to the spaces between the detents 404 on the outer circumference of the microphone boom assembly 112 proximal end. When the microphone boom assembly 112 is rotated to a position at which the bump 410 corresponds to one of the detents 404, the spring energy stored within the deformable rubber portion 406 of the pivot plug 404 secures the bump 410 into the corresponding detent 404. Stops 412 formed in the receiver assembly first half 104a and second half 104b limit the rotation of the microphone boom assembly 112.

Figure 6:
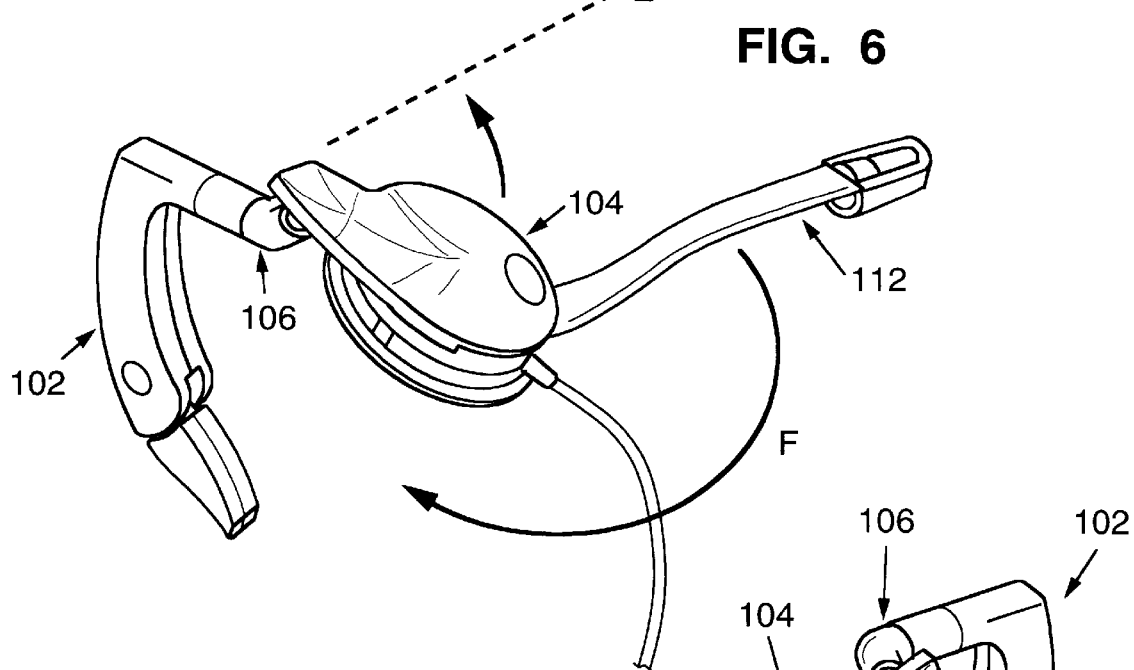
FIG. 6 is a side elevational view of the communications headset of FIG. 1 with the earpiece assembly swung 180 degrees from its position in FIG. 5 and with the microphone boom swung in the opposite direction.
Figure 7:
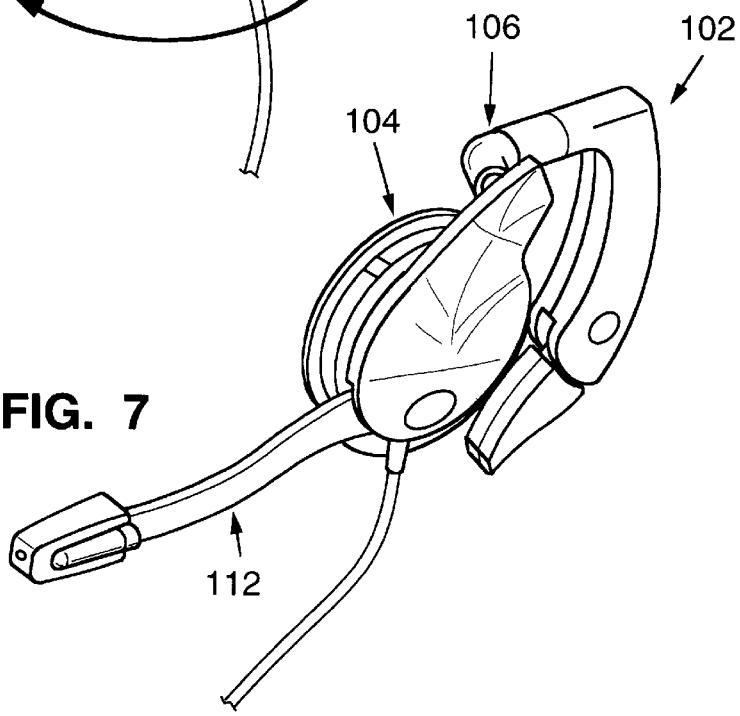
FIG. 7 is a side elevational view of the communications headset of FIG. 1 with the earpiece assembly rotated from FIG. 5 to a position against the opposite ear.

FIG. 1 shows the communications headset 100 configured for use on the right ear (i.e., in a position at which the receiver assembly is against the right ear). The communications headset 100 can be easily reconfigured for use on the left ear. To reconfigure the communications headset 100 for use on the left ear, the receiver assembly 104 is first rotated up, in the direction shown by arrow A, to the position shown by dotted line E in FIG. 5. Notably, when the receiver assembly 104 is rotated up as shown in FIG. 5, the swivel ball 228 allows for the receiver assembly 104 to be rotated 360 degrees in the plane which contains the receiver assembly 104. From the position shown in FIG. 5, the receiver assembly 104 is swung 180 degrees in the direction shown by arrow D, to the position indicated by dotted line E (FIG. 6). After the receiver assembly 104 is swung to the position indicated by the dotted line E, the microphone boom assembly 112 is swung in the opposite direction, in the direction shown by the arrow F. Finally, the receiver assembly 104 is swung back down into a position at which the receiver assembly is against the left ear.

What is claimed is:

1. A communications headset to be worn on an ear of a user, comprising:

an earpiece housing that rests on top of the ear;

a receiver assembly;

coupling means for coupling the receiver assembly to the earpiece housing such that the receiver assembly is rotatable between a position at which the receiver assembly is against the ear and an away-from-the-ear position at which the receiver assembly is rotated at least 90 degrees away from the ear;

biasing means for biasing the receiver assembly toward the ear when the receiver assembly is at other than the away-from-the ear position, the biasing means thereby coupling the receiver assembly snugly to the ear when the receiver assembly is at the position against the ear; and securing means for, when the receiver assembly is moved to the away-from-the-ear position, automatically engaging the coupling means such that the receiver assembly is securely held in the away-from-the-ear position.

2. The communications headset of claim 1, wherein the coupling means includes:

an arm having a first end and a second end, the receiver assembly being attached to the first end of the arm and the second end of the arm being rotatable within the earpiece housing between a first arm position, so that the receiver assembly is at the position against the ear, and a second arm position, so that the receiver assembly is at the away-from-the-ear position.

3. The communications headset of claim 2, wherein the biasing means biases the arm toward the first arm position when the arm is not at the second arm position.

4. The communications headset of claim 5, wherein the securing means automatically engages the arm at the second arm position when the arm is moved to the second arm position so that the receiver assembly is held securely in position when the receiver assembly is at the away-from-the-ear position.

5. A communications headset to be worn on an ear, comprising:

an earpiece housing that rests on top of the ear;

a receiver assembly;

coupling means for coupling the receiver assembly to the earpiece housing such that the receiver assembly is rotatable between a first position at which the receiver assembly is against the ear and a second position at which the receiver assembly is rotated away from the ear; and biasing means for biasing the receiver assembly toward the ear when the receiver assembly is between the first position and the second position but not when the receiver assembly is at the second position, the biasing means thereby causing the receiver assembly to be coupled snugly to the ear.

6. The communications headset of claim 5, and further comprising:

securing means for, when the receiver assembly is moved to the position rotated away from the ear, automatically engaging the coupling means such that the receiver assembly is securely held to the position rotated away from the ear.

7. A communications headset to be worn on an ear of a user, comprising:

an earpiece housing that rests on top of the ear;

a receiver assembly;

coupling means for coupling the receiver assembly to the earpiece housing such that the receiver assembly is rotatable between a position at which the receiver assembly is against the ear and an away-from-the-ear position at which the receiver assembly is rotated at least 90 degrees away from the car;

biasing means having first and second opposing sidewalls, the first and second sidewalls being biased against the coupling means to couple the receiver assembly snugly to the ear when the receiver assembly is at the position against the ear, and at least one of the first and second sidewalls having a detent to automatically engage the coupling means when the receiver assembly is in the away-from-the-ear position such that the receiver assembly is securely held in the away-from-the-ear position.

8. The communications headset of claim 7, wherein the coupling means includes a shaft rotatable between a first position at which the receiver assembly is against the ear and a second position at which the receiver assembly is at the away-from-the-ear position, the coupling means further including a paddle at one end of the shaft, the first and second sidewalls of the biasing means are biased against the paddle to couple the receiver assembly snugly to the ear when the receiver assembly is at the position against the ear, and the detent automatically engages the paddle when the receiver assembly is at the away-from-the-ear position.

* * * * *